PULSE GENERATOR — PEAK CLIPPER

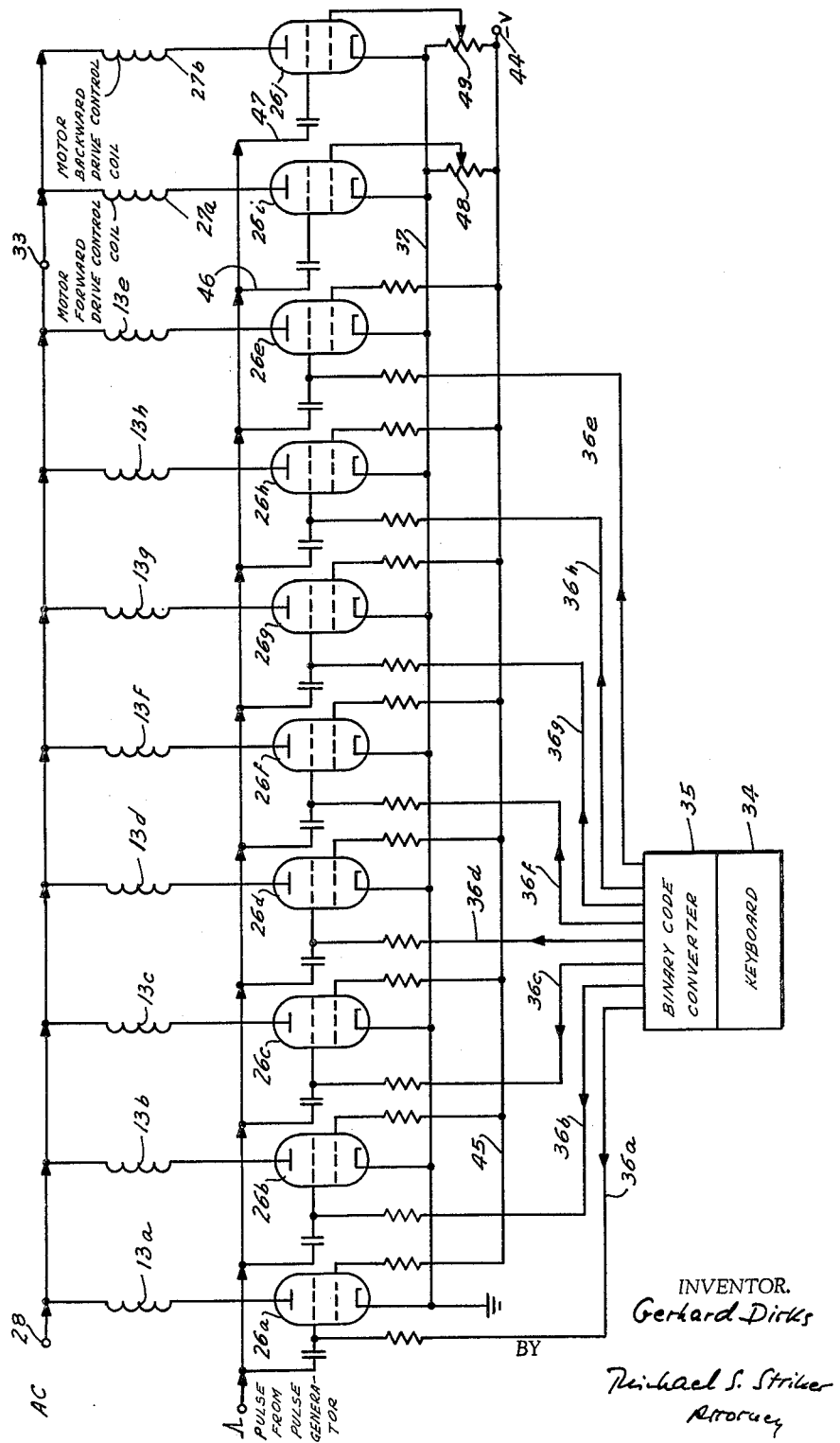

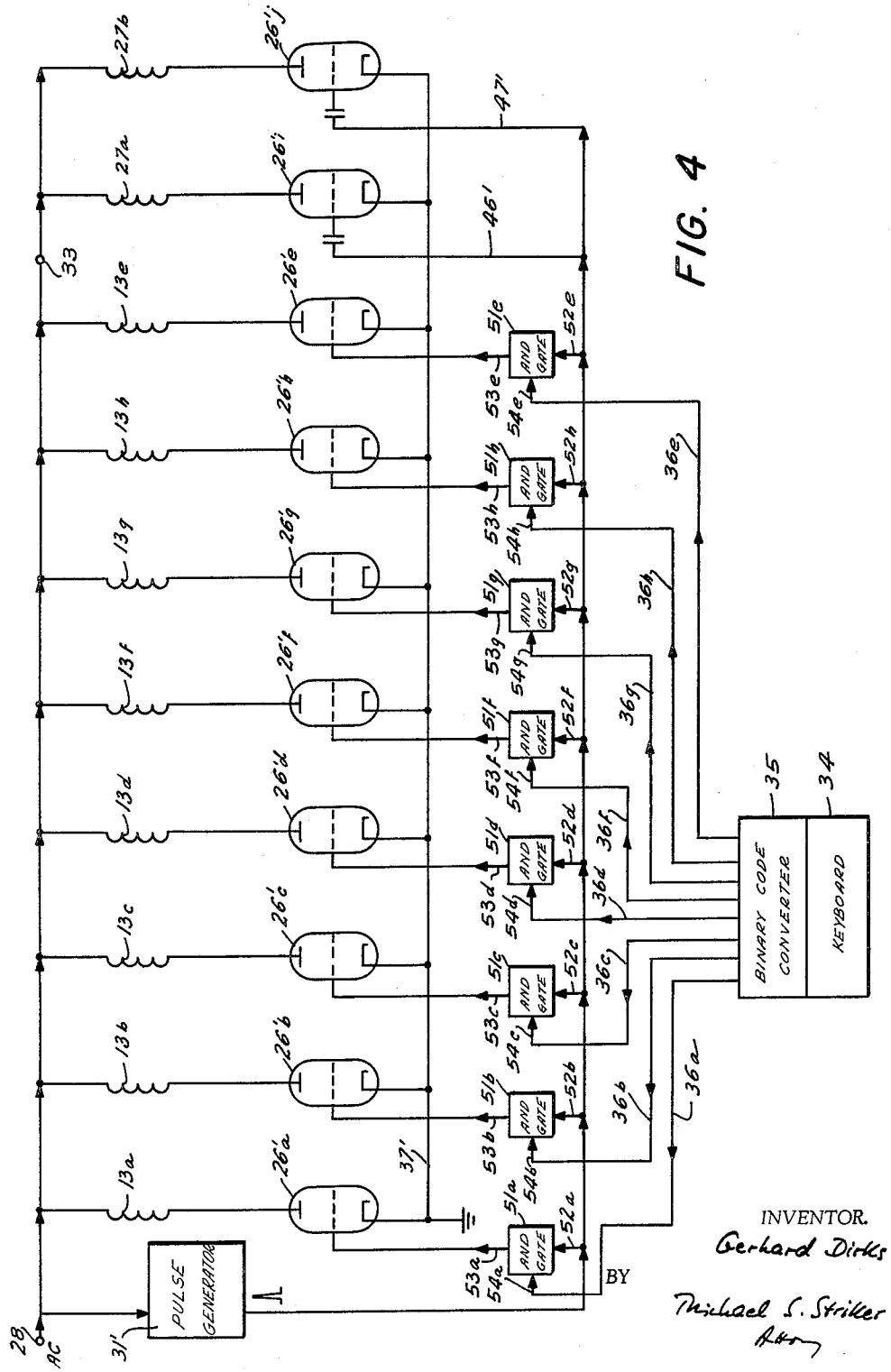

DIFFERENTIATOR — PULSE FIRES THYRATRONS

PERFORATOR CONTROL — POSITIVE PORTION OF AC POWERS SOLENOIDS

MOVING CONTROL — POSITIVE PORTION OF AC POWERS MOTOR COILS

United States Patent Office 3,093,303
Patented June 11, 1963

3,093,303
TAPE PERFORATION AND MOVEMENT
CONTROL SYSTEM
Gerhard Dirks, 12120 Edgecliff Place,
Los Altos Hills, Calif.
Filed Jan. 18, 1962, Ser. No. 167,043
10 Claims. (Cl. 234—108)

The present invention relates to a tape perforation and movement control system. More particularly, the invention relates to an electronic circuit arrangement for controlling the perforation and movement of a tape.

The principal object of the present invention is to provide a new and improved tape perforation and movement control system.

An object of the present invention is to provide an electronic circuit arrangement for controlling the perforation and movement of a tape.

An object of the present invention is to provide a tape perforation and movement control system which is efficient and reliable in operation although of simple structure.

An object of the present invention to provide a tape perforation and movement control system which utilizes an alternating current to power the perforation and movement operation.

An object of the present invention is to provide a tape perforation and movement control system which utilizes a pulse derived from an alternating current to control the application of power to the perforation and movement operation in a desired time sequence.

An object of the present invention is to provide a tape perforation and movement control system which provides a coded combination of perforations in accordance with the manual operation of a keyboard in a new and improved manner.

Another object of the present invention is to provide a tape perforation and movement control system which is inexpensive in manufacture and in operation.

In accordance with the present invention, a perforator of known type is controlled in operation. The perforator has a plurality of pins spaced from and adapted to perforate a tape and a plurality of solenoids each adapted to move a corresponding one of the pins into one of a perforating position wherein the one of the pins perforates the tape and a non-perforating position wherein the one of the pins remains spaced from the tape. Moving means of known type is adapted to move a tape in operative relation to the perforator in predetermined increments in one of a forward and backward direction relative to the perforator. The moving means has forward and backward drive control coil means.

In accordance with the present invention, the tape perforating and moving control system comprises an alternating current power supply for providing alternating current power. A pulse generator derives control pulses from the alternating current power at determined time instants of the cyclic period of the alternating current power. A perforator control is interconnected between the alternating current power supply and the solenoids of the perforator and a binary code keyboard provides code combination signals to the perforator control under control of a keyboard, the binary code keyboard being adapted to prepare selected components of the perforator control in accordance with the code combination signals. A moving control is interconnected between the alternating current power supply and the forward and backward drive control of the moving control. A pulse gate is interconnected between the pulse generator and each of the perforator control and the moving control and controls the transmission of control pulses from the pulse generator to a selected one of the perforator control and the moving control in a manner whereby the operation of each of the perforator control and the moving control is dependent upon the transmission of the control pulses thereto at determined time instants and the condition of conduction of the pulse gate.

In order that the present invention may be readily carried into effect, it will now be described with reference to the accompanying drawings, wherein:

FIG. 3 is a schematic circuit diagram of an embodiment of the perforator control of the arrangement of FIG. 1;

FIG. 4 is a schematic circuit diagram of another embodiment of the perforator control of the arrangement of FIG. 1;

Figure 1:
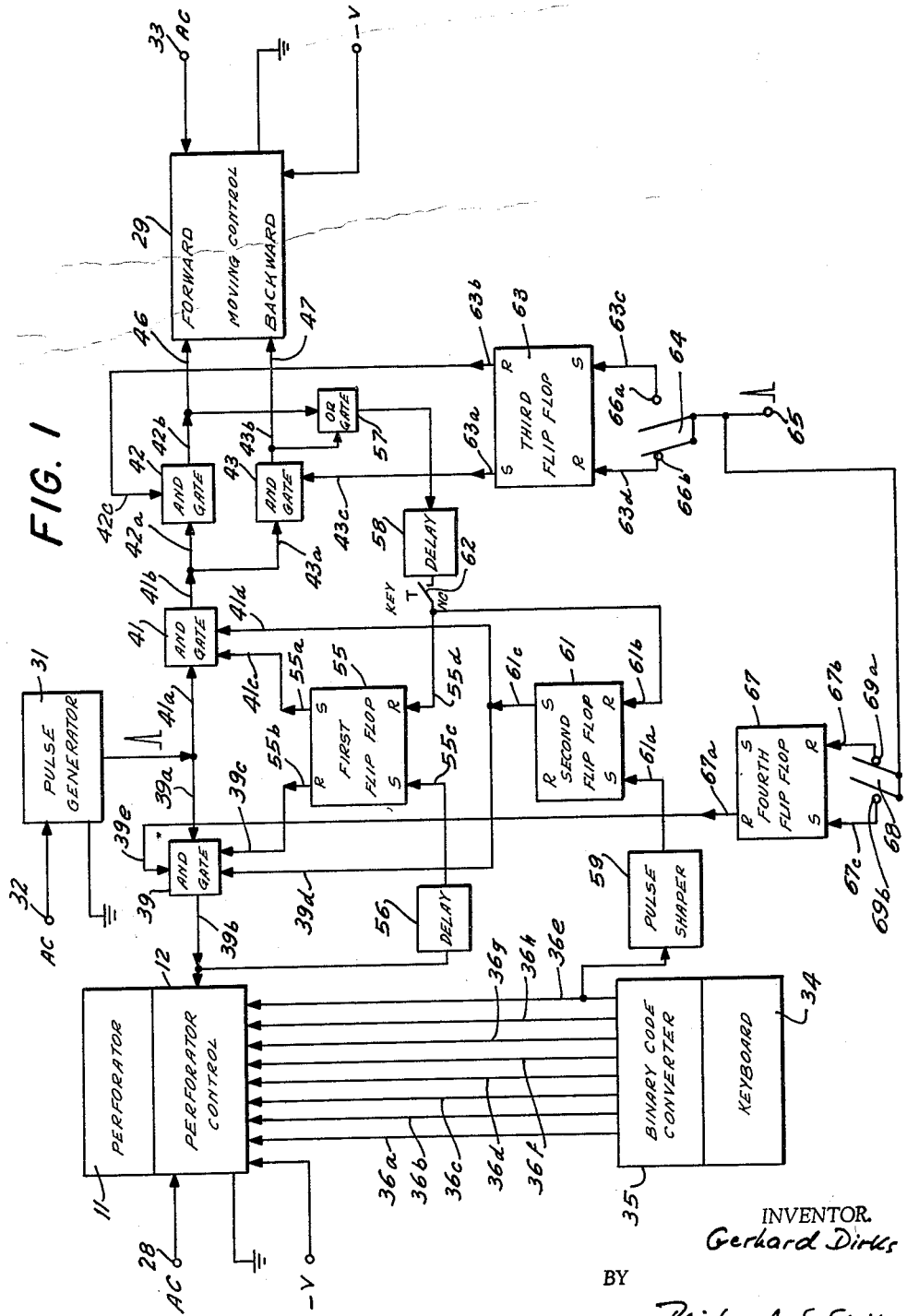
FIG. 1 is a schematic block diagram of an embodiment of the tape perforation and movement control system of the present invention.
Figure 2:
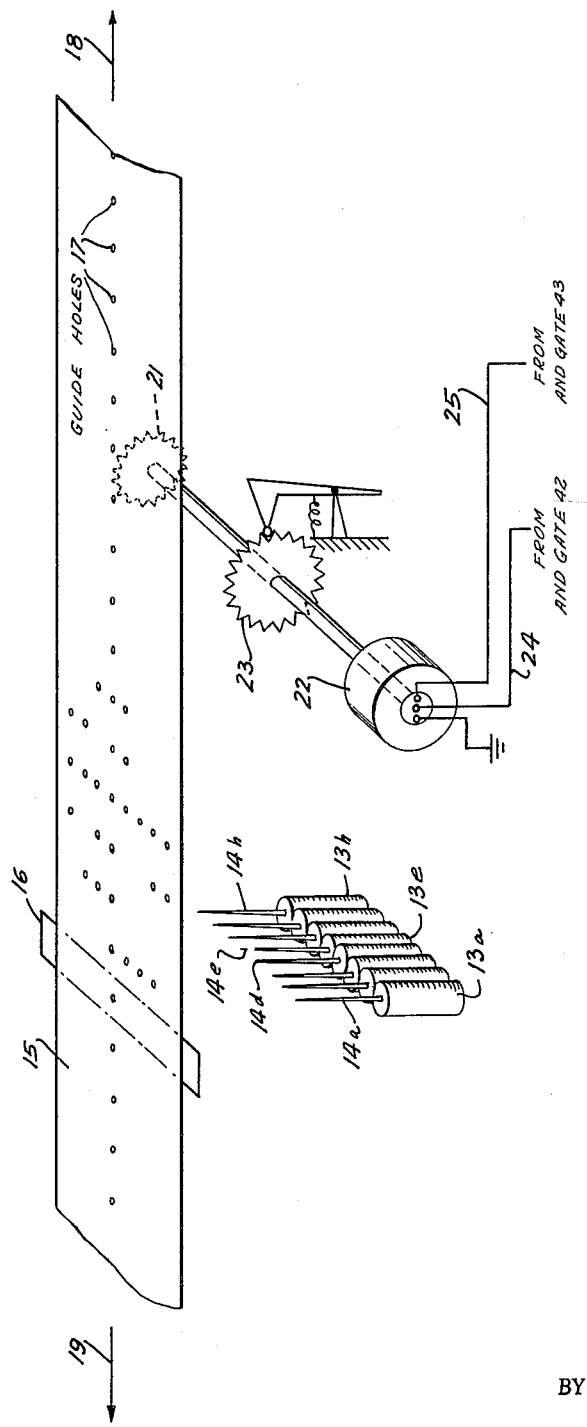
FIG. 2 is a perspective view of the perforator and tape moving arrangement which may be utilized with the system of the present invention.

In FIG. 1, a perforator 11 of known type, such as, for example, that shown in FIG. 2, is controlled in operation by a perforator control 12. The perforator 11 utilizes a plurality of solenoids 13a to 13h to provide the moving impetus to a plurality of associated perforator pins 14a to 14h, as shown in FIG. 2. The simplification of the structure of the present perforator is due to the replacement of the usual cam and motor combination by the solenoids and the utilization of the solenoids is made more practicable by the use of an A.C. power source rather than the known systems which utilize D.C. D.C. systems require much more complex apparatus, such as, for example, rectifiers and circuit controls than do A.C. systems.

The tape perforation and movement control system of the present invention may be utilized to provide a tape perforated in accordance with a code of any practical number of component units, such as, for example, a five unit, seven unit, nine unit, or etc., code. For the purpose of illustration of the present invention, however, a seven unit code is assumed to be desired. This code is understood to constitute a binary code of the usual known type.

In FIG. 2, a tape 15 is perforated by the perforator arrangement at the area 16, indicated in broken lines, along a line transverse to the direction of movement of the tape and along which the pins 14a to 14h are adapted to perforate said tape. The pins 14a to 14h are normally spaced from the tape 15, and when one of the solenoids 13a to 13h is energized the corresponding perforator pin will be moved into contact with and through said tape thereby perforating it at the location of said pin. A pin 14e is normally continuously energized by its corresponding solenoid 13e and functions to perforate the tape 15 with guide or reference holes 17 in a line running along the direction of movement of said tape. The reference holes 17 are utilized to move the tape in a desired one of a forward and backward direction relative to the perforator, and more particularly relative to the perforating area 16.

The tape 15 is moved in either a forward direction 18 relative to the perforator or a backward direction 19 relative to said perforator by a tape moving arrangement, as shown in FIG. 2. The tape moving arrangement is of known type and may utilize a ratchet 21 adapted to engage the guide holes 17 of the tape 15; the ratchet being driven by a motor 22. The motor 22 may be a known type of step motor, or it may be utilized in combination with a stepping arrangement 23 which imparts a step movement to the ratchet 21. The stepping arrangement 23 may comprise, for example, a disc or wheel having peripheral notches or grooves formed therein and a detent positioned in spring-biased cooperative relation with said disc or wheel to impart a notch-to-notch or stepwise movement thereto. If the stepping arrangement 23 is mounted on the same shaft as the ratchet 21, and is driven by the motor 22 through said shaft, the tape 15 will be moved, in a direction depending upon the direction of energization of said motor, by said motor when it is energized.

The motor 22 preferably comprises a forward drive control coil and a backward drive control coil. In FIG. 2, the forward drive control coil is connected to a lead 24 and the backward drive control coil is connected to a lead 25. Thus, when sufficient power is supplied through the lead 24, the forward drive control coil of the motor 22 is energized and said motor drives the ratchet 21 to move the tape in the forward direction 18. When sufficient power is supplied through the lead 25, the backward drive control coil of the motor 22 is energized and said motor drives the ratchet 21 to move the tape 15 in the backward direction 19.

FIG. 3 is a schematic circuit arrangement of an embodiment of a perforator control which may be utilized as the perforator control 12 of FIG. 1 and FIG. 4 is schematic circuit diagram of another embodiment of a perforator control which may be utilized as said perforator control 12.

In FIG. 3, a plurality of thyratrons 26a to 26j is utilized to provide the switching of power to the appropriate, or selected, solenoids 13a to 13h and to the selected one of the forward drive control coil 27a and the backward drive control coil 27b of the motor 22. The thyratron 26a is adapted to switch power to the corresponding solenoid 13a of the perforator, the thyratron 26b is adapted to switch power to the corresponding solenoid 13b, the thyratron 26c is adapted to switch power to the corresponding solenoid 13c, the thyratron 26d is adapted to switch power to the corresponding solenoid 13d, the thyratron 26f is adapted to switch power to the corresponding solenoid 13f, the thyratron 26g is adapted to switch power to the corresponding solenoid 13g and the thyratron 26h is adapted to switch power to the corresponding solenoid 13h. The thyratron 26e is adapted to switch power to the corresponding solenoid 13e, which is utilized to perforate the tape 15 with the reference holes 17. Although the solenoid 13e is in fact positioned intermediate the other solenoids of the perforator, as shown in FIG. 2, in the circuit diagram of FIGS. 1, 3 and 4, the solenoid 13e is positioned out of context in order to maintain the clarity of illustration; it being obvious, of course, that the electrical indication of the component does not necessarily determine its actual physical position, in the structure. The thyratron 26i is adated to switch power to the forward drive control coil 27a of the motor 22 and the thyratron 26j is adapted to switch power to the backward drive control coil 27b of said motor.

In accordance with the principal feature of the present invention, the utilization of D.C. and/or mechanical arrangements to move the perforator pins 14a to 14h is eliminated and A.C. is used for this purpose. A.C. power is supplied to the perforator control 12, as shown in FIG. 1, via a power input terminal 28. Alternating current power is also supplied to a moving control 29 and to a pulse generator 31. Although the A.C. power supplied to each of the perforator controls 12, the moving control 29 and the pulse generator 31 may come from separate sources, the same source may be utilized to provide power for all of these components. For the purpose of illustration, the A.C. power input terminals will be identified by separate input terminal designations.

It may be assumed that the A.C. power comes from a common source. A.C. power is supplied to the pulse generator 31 through a power input terminal 32 and to the moving control 29 through a power input terminal 33. The pulse generator 31 functions to convert the incoming A.C. to a pulse train. The pulse generator 31 may comprise any suitable type of pulse generator known in the art which is adapted to derive a pulse from an input A.C. In a typical pulse generator operation, the positive portions of the incoming A.C. are first clipped by a peak clipper operation and the resultant positive substantially square waves are differentiated in a differentiating operation to provide substantially sharp pulses at the leading edge of each positive and negative portion of the incoming A.C.

Figure 5A:
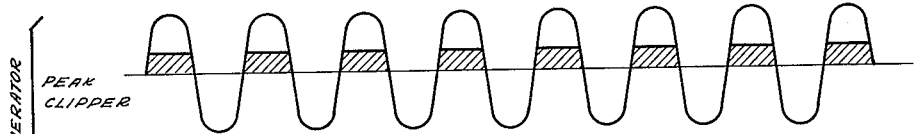
FIGS. 5a, 5b, 5c and 5d are graphical presentations of the waveshapes present in the arrangement of FIG. 1 during the operation thereof.
Figure 5B:
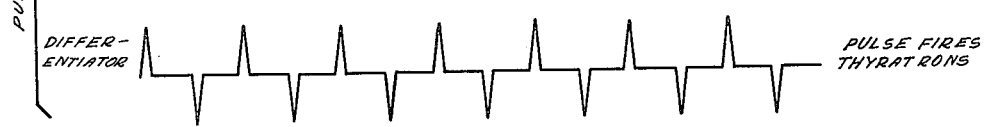
Figure 6:
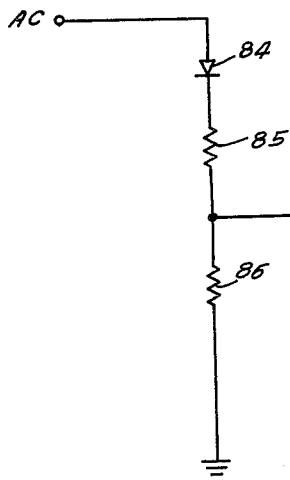
FIG. 6 is a schematic circuit diagram of an embodiment of the pulse generator of the arrangement of FIG. 1.

FIG. 5a shows the incoming A.C. converted to square waves by the peak clipping operation in the pulse generator and FIG. 5b shows the pulses derived from the square waves of FIG. 5a as a result of the differentiation operation of the pulse generator 31. A suitable pulse generator may comprise for example, that shown in FIG. 6, wherein the initial clipping operation is achieved by a rectifier 84 and resistor 85 circuit, and the differentiation is achieved by a resistor 86 and capacitor 87 differentiator circuit.

The positive pulses derived from the A.C. by the pulse generator 31 are utilized in the circuit arrangement of the present invention, as will be explained hereinafter, and the remainder of each positive portion of the A.C. is utilized to power or energize the solenoids 13a to 13h and the forward and backward drive control coils 27a and 27b of the motor 22. Due to the operation of the circuit arrangement of the present invention, as will be evident after the discussion thereof, the remainders of alternate ones of the positive portions of the A.C. are applied to power the selected ones of the solenoids 13a to 13h of the perforator, as illustrated in FIG. 5c, and the remainders of the alternate positive portions of the A.C. are applied to power the selected one of the drive control coils 27a and 27b of the motor, as illustrated in FIG. 5d.

Figure 5C:
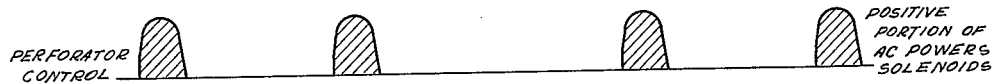
Figure 5D:

FIGS. 5c and 5d illustrate an important advantage of the perforator and moving control system of the present invention. These figures illustrate the application to the selected solenoids and motor drive control coils of the power of the whole positive half cycle of the A.C., due to the delivery, by the circuit arrangement of FIG. 1, of the control pulses at the beginning of the rise time of the voltage of the power supply, as shown in FIG. 5b. This insures constant conditions for the energization of the perforator solenoids and motor drive control coils; the current being switched almost at the beginning of the positive half wave, just after the control pulse is applied, and being cut off as soon as it passes through its zero condition and becomes negative, that is, below the thyratron cutoff voltage.

The alternate positive half waves supplied to the power input terminals 28 and 33 of FIG. 3 are provided by any suitable rectifier means known in the art and are not illustrated in the figures. The alternate positive half waves may for example be derived from the circuit arrangement of FIG. 6.

In FIG. 1, a keyboard 34 is provided to enable an operator to transmit desired intelligence to the perforator control 12 and thereby provide for the perforation of the tape 15 in binary code corresponding to the information indicated by the depressed keys of said keyboard. Thus, a binary code converter 35 is connected to the keys of the keyboard 34 in known fashion and functions to convert the intelligence indicated by the depressed keys of said keyboard into a binary code. Both the keyboard 34 and the binary code converter 35 are of well known type and may comprise any suitable keyboard arrangement and any suitable binary code converter arrangement known in the art, such as, for example, the keyboard and binary code converter arrangements disclosed in my copending patent application, Serial No. 617,524, filed October 22, 1956. The code converter 35 may preferably comprise a diode matrix of known type, such as, for example, that disclosed in my aforementioned copending patent application.

The output of the binary code converter 35 is supplied to the perforator control 12. In view of the fact that a seven unit code is presumed for the purpose of illustration, eight lines are connected from the output of the binary code converter 35 to the input of the perforator control 12. Each of seven of the connecting lines 36a, 36b, 36c, 36d, 36f, 36g and 36h corresponds to an associated perforator solenoid 13a, 13b, 13c, 13d, 13f, 13g and 13h, respectively, and therefore corresponds to a particular unit of the code. The eight line 36e leads to the solenoid 13e through the thyratron 26e and is therefore instrumental in providing the reference holes 17.

Each time a key of the keyboard 34 is depressed, a signal is supplied from the binary code converter 35 to the perforator control 12 to insure the operation of the reference hole perforator pin 14e, as long as the tape 15 is being moved in the forward direction 18. The connecting leads 36a to 36h are connected in the perforator control 12 to control grids of the corresponding thyratrons 26a to 26h. The cathodes of the thyratrons 26a to 26j are connected in common to a point at ground potential through a common ground lead 37. Each solenoid of the perforator 11 is connected at one end to the anode of the corresponding thyratron and at the other end to the A.C. input terminal 28. Each motor drive control coil is connected between the anode of the corresponding thyratron at one end and the A.C. input terminal 33 at the other end.

As illustrated in FIG. 1, the pulse generator 31 is connected to the perforator control 12 through an AND gate 39 and to the moving control 29 through an AND gate 41 and AND gates 42 and 43. As illustrated in FIG. 3, the pulse provided by the pulse generator 31 is supplied through the AND gate 39 to the same control grid of each thyratron to which the connecting lead from the binary code converter 35 is connected. Another control grid of each Thyratron 26a to 26h is resistance connected to a source of negative voltage through a negative voltage input terminal 44 and a common lead 45. The pulse from the pulse generator 31 is supplied to a control grid of each of the Thyratrons 26i and 26j through AND gates 41, 42 and 43 via leads 46 and 47. Another control grid of each of the Thyratrons 26i and 26j is connected to the source of negative voltage through potentiometers 48 and 49, respectively.

The magnitude of the negative voltage supplied via the negative voltage input terminal 44 is in the vicinity of 10 volts and depends upon the firing characteristics of the thyratrons. This negative voltage is utilized to provide a suitable biasing voltage to each of the thyratrons; the potentiometers 48 and 49 being utilized to provide a biasing voltage of lesser magnitude to the thyratrons 26i and 26j. The thyratrons are thus negatively biased.

When a key of the keyboard 34 is depressed, the binary code converter 35 supplies a signal through the connecting lines 36a to 36h which corresponds to the code equivalent of the intelligence indicated by the depressed key; a signal being supplied automatically, upon the depression of any key, to the thyratron 26e via the connecting lead 36e. This supplies a positive bias to the control grids of those thyratrons corresponding or connected to the leads from the binary code converter 35 which carry a signal. The selected thyratrons, which correspond to the code equivalent of the punched key, are then placed in ready condition, or are prepared for operation, by the signals from the binary code converter 35. The total bias on these selected thyratrons is insufficient to fire them, so that in the absence of further stimulus, they remain in ready condition. The negative bias on the thyratrons 26i and 26j, being less than, or more positive than, the negative bias on the other thyratrons, maintains these two thyratrons in a substantially ready condition somewhat similar to the ready condition of the code converter connected thyratrons.

The A.C. power is continuously applied to one end of the solenoids 13a to 13h and the coils 27a and 27b and upon the appropriate AND gates being in their conductive condition, the pulse provided by the pulse generator 31 is continuously supplied to the thyratrons 26a to 26j. Those thyratrons which are in ready condition, upon the receipt of the control pulse from the pulse generator 31, due to the operation of the circuit arrangement of FIG. 1 as will be hereinafter described, fire and provide a conductive path to ground for their corresponding solenoids thereby causing such solenoids to be fully powered by the A.C. being fed through the power input terminal 28.

The thyratrons 26i and 26j, being normally in substantially ready condition, are fired by the control pulse from the pulse generator 31 when the intervening AND gates are in their conductive condition. That is, when the AND gate 41 is open or conductive and the AND gate 42 is open, or conductive due to the operation of the circuit arrangement for forward movement of the tape 15, the control pulse is supplied to the thyratron 26i through the lead 46 and fires said thyratron to provide a conductive path to ground for the forward drive control coil 27a thereby causing such control coil to be fully powered by the A.C. being fed through the power input terminal 33. When the AND gate 41 is open, and the AND gate 43 is open, due to the operation of the circuit arrangement for backward movement of the tape 15, the control pulse is supplied to the thyratron 26j through the lead 47 and fires said thyratron to provide a conductive path to ground for the backward drive control coil 27b thereby causing such control coil to be fully powered by the A.C. being fed through the power input terminal 33.

In FIG. 4, which is another embodiment of the perforator control 12 of the arrangement of FIG. 1, thyratrons having a single control grid are utilized instead of thyratrons having two control grids, as shown in FIG. 3. Each of the thyratrons 26'a to 26'h is connected to a corresponding one of the solenoids 13a to 13h, each solenoid being connected at one end to the anode of its corresponding thyratron and at the other end to the A.C. power input terminal 28. The forward drive control coil 27a of the motor 22 is connected between the anode of the thyratron 26'i and the A.C. power input terminal 33 and the backward drive control coil 26b is connected between the anode of the thyratron 26'j and the A.C. power input terminal 33. The cathodes of the thyratrons 26'a to 26'j are connected to a point at ground potential through a common ground lead 37'. Instead of utilizing another control grid in each thyratron to bring the thyratrons to their ready condition and then to carry them beyond their ready condition into firing condition, the thyratrons are initially biased to essentially ready condition and the control pulses from the pulse generator 31' fire them directly under the control of the code intelligence provided by the binary code converter 35. The control pulse from the pulse generator 31' is supplied to the control grid of the thyratron 26'i via lead 46' and to the control grid of the thyratron 26'j via lead 47'.

The AND gates of the circuit arrangement of FIG. 1 which control the supply of the control pulses from the pulse generator 31' to the thyratron 26'a to 26'j in accordance with the operation of said circuit arrangement, are not shown in FIG. 4. Thus, when the operation of the circuit arrangement is such as to permit the application of the control pulse to the lead 46', the thyratron 26'i is fired and provides a conductive path to ground for the control coil 27a so that the A.C. powers such control coil and thereby causes the forward movement of the tape 15. When the operation of the circuit arrangement is such as to permit the application of the control pulse to the lead 47', the thyratron 26'j is fired and provides a conductive path to ground for the control coil 27b so that the A.C. from the terminal 33 powers such control coil thereby causing the backward movement of the tape 15.

A plurality of AND gates 51a to 51h is provided. Each of the AND gates 51a to 51h has an input 52a to 52h, respectively, for a signal which is desired to be gated therethrough, a control input 54a to 54h, respectively, for a control signal which controls the gating of the first-mentioned signal, and an output 53a to 53h, respectively, for the signal derived from the gate after it is gated. Each AND gate 51a to 51h is of any suitable known type and functions in a known manner to either conduct a signal from its input to its output or to prevent the conduction of a signal from its input to its output under the control of its control input. Each AND gate is brought to its conductive condition upon the simultaneous occurrence of a signal at each of its input and control input leads; that is, it will conduct or gate a signal from its input to its output when a signal is applied at the control input at the same time as the input signal is applied at the input. In the same manner, each AND gate is in its non-conductive condition when no signal is present at its control input; that is, it will fail to conduct or block a signal from its input and prevent it from reaching its output when there is no signal at its control input.

The connecting lines 36a to 36h from the binary code converter 35 are connected to the control inputs 54a to 54h of the AND gates 51a to 51h and the control pulses provided by the pulse generator 31' are supplied to the inputs 52a to 52h of said AND gates. Although the control pulses from the pulse generator 31' are continuously applied to the inputs 52a to 52h of the AND gates 51a to 52h, they are not conducted to the control grids of the thyratrons 26'a to 26'h corresponding or connected to the AND gates until a signal from the binary code converter 35 is supplied to the control inputs of said AND gates. The AND gates selected by the binary code converter 35 in accordance with the code equivalent of the intelligence keyed on the keyboard 34 will conduct and permit the application of the control pulse from the pulse generator 31' to the control grid of the selected corresponding thyratrons and will fire said thyratrons to provide a conductive path to ground for the corresponding solenoids thereby powering said solenoids with the full positive A.C. power from the power input terminal 28. Similarly to the arrangement of FIG. 3, the AND gate 51e is made conductive as soon as any key of the keyboard 34 is depressed in order to enable perforation of the reference holes 17.

In FIG. 1, the AND gate 39 has an input 39a, an output 39b and three control inputs 39c, 39d and 39e. The AND gate 41 has an input 41a, an output 41b and two control inputs 41c and 41d. The AND gate 42 has an input 42a, an output 42b and a control input 42c. The AND gate 43 has an input 43a, an output 43b and a control input 43c. Each of the AND gates 39, 41, 42 and 43 may comprise any suitable AND gate known in the art and each of these AND gates may be similar in structure and operation to the AND gates 51a to 51h of FIG. 4. The only difference between the AND gates 39 and 41 of FIG. 1 and those of FIG. 4 is that each of the AND gates 39 and 41 has more than one control input. The utilization of AND gates having a plurality of control inputs is well known in the art and any suitable AND gates of such type may be utilized for the AND gates 39 and 41.

A first flip flop 55 is connected with its set output 55a connected to the control input 41c of the AND gate 41, with its Reset output 55b connected to the control input 39c of the AND gate 39, with its Set input 55c connected to a point common to the AND gate 39 and the perforator control 12 in the output 39b of the said last-mentioned AND gate through a delay 56, and with its Reset input 55d connected to a point common to the AND gate 42 and the moving control 29 in the output 42b of said AND gate and to a point common to the AND gate 43 and the moving control 29 in the output 43b of said AND gate through an OR gate 57, a delay 58 and a key-operated normally closed switch 62.

The first flip flop 55, as well as the other flip flops in the circuit arrangement of FIG. 1, may comprise any suitable flip flop known in the art. Any suitable bistable multivibrator known in the art may be utilized to provide the flip flop operation, which entails the placing of the flip flop circuit in a first stable state, such as, for example, its Set condition or state, in which an output signal is provided at the Set output and the switching of the flip flop circuit to its second sable state, which in this example is its Reset condition or state, in which an output signal is provided at the Reset output. When the flip flop circuit receives a suitable signal at its Set input it is switched to its Set condition and produces an output signal at its Set output whereas no signal is produced at its Reset output. When the flip flop circuit receives a suitable signal at its Reset input it is switched to its Reset condition and produces an output signal at its Reset output whereas no signal is produced at its Set output. The flip flop circuit thus switches from one stable state to the other under the control of the input signals fed to it, in a manner well known in the art.

The first flip flop 55, in conjunction with the AND gates 39 and 41 and 42 and 43, functions as a switching arrangement for the control pulse derived from the pulse generator to the perforator control 12 and to the moving control 29. Without any further circuitry in FIG. 1 and with only the control input 39c for the AND gate 39, beside its input and output 39a and 39b, and with only the control input 41c of the AND gate 41, beside its input and output 41a and 41b, and without the influence of the AND gates 42 and 43, the circuit arrangement 55, 39 and 41 will alternately switch the power to the perforator control 12 and the moving control 29. That is, first the perforator control 12 will be energized by powering the selected solenoids through the control pulse from the pulse generator 31, then the moving control 29 will be energized by powering the selected motor drive control coil through said control pulse, then the selected solenoids of the perforator 11 will be energized or powered, then the selected motor drive control coil will be energized, etc., in a cyclic fashion. The alternate powering of the perforator solenoids and motor drive control coils occurs at the leading edge of each positive half cycle of the A.C. power, as shown by the position of the control pulses in FIG. 5b, and extends for the remainder of the positive half cycle of the A.C. power, as shown in FIGS. 5c and 5d.

If the first flip flop 55 is in its Set condition, a signal is provided at its Set output 55a and is supplied to the control input 41c of the AND gate 41 thereby placing said AND gate in its conductive condition so that said AND gate transmits the control pulse provided by the pulse generator 31 to the selected motor drive control coil of the moving control 29. The control pulse, when applied to the corresponding thyratron of the selected motor drive control coil, fires said thyratron thereby closing a conductive path to ground and powering the corresponding drive control coil with A.C. through the power input terminal 33. The tape 15 is then moved in the forward or backward direction depending upon which of the motor drive control coils 27a and 27b was selected and powered.

When the AND gate 41 passes the control pulse from the pulse generator 31 to the moving control 29, said control pulse is transmitted through the OR gate 57 and a substantially small time delay 58 of a few, such as, for example, 5, microseconds to the Reset input 55d of the first flip flop 55. The application of the control pulse to the Reset input 55d of the first flip flop 55 places or switches said flip flop to its Reset condition and said flip flop provides an output signal at its Reset output 55b which output signal is supplied to the control input 39c of the AND gate 39 thereby placing said AND gate in its conductive condition so that the said AND gate transmits the control pulse provided by the pulse generator 31 to the selected solenoids of the perforator 11 through the corresponding thyratrons of the perforator control 12. There is no output signal at the set output 55a since the flip flop 55 is in its Reset condition, so that the AND gate 41 is placed in its non-conductive condition and blocks the control pulse from the pulse generator 31 thereby causing the moving control 29 to become inactive or deenergized. The control pulse, when passed by the AND gate 39, is applied to the corresponding thyratrons of the perforator control 12 and fires said thyratrons thereby closing conductive paths to ground and powering the corresponding solenoids with AC through the power input terminal 28. The corresponding perforator pins 14a to 14h are then moved to perforate the tape 15 as indicated by the coded output of the binary code converter 35.

When the AND gate 39 passes the control pulse from the pulse generator 31 to the perforator 12, said control pulse is transmitted through the delay 56 of a few, such as, for example 5, microseconds to the Set input 55c of the first flip flop 55. The application of the control pulse to the Set input 55c of the first flip flop 55 switches said flip flop to its Set condition and said flip flop provides an output signal at its Set output 55a which output signal is supplied to the control input 41c of the AND gate 41 thereby placing said AND gate in its conductive condition and placing the AND gate 39 in its non-conductive condition so that the AND gate 39 blocks the control pulse from the pulse generator 31 thereby causing the perforator 11 to become inactive or deenergized. The control pulse from the pulse generator 31 is then supplied through the AND gate 41 to the moving control 29 and the cycle is repeated with the tape being moved in the selected direction, then the selected perforator pins perforating the tape, then the tape being moved, etc.

It is thus clear that without further circuitry the arrangement 55, 39 and 41 will alternately operate the perforator control 12 to perforate the tape and the moving control 29 to move the tape.

A pulse shaper 59, which may comprise any suitable pulse shaper arrangement known in the art, such as, for example, a monostable multivibrator circuit of known type which functions to provide an output pulse during a stable period of operation. The input of the pulse shaper 59 is connected to the connecting lead 36e from the binary code converter 35 to the perforator control 12, so that each time a key of the keyboard 34 is depressed an input signal is fed to the pulse shaper 59 which then converts it into a substantially sharp pulse suitable for controlling a flip flop.

A second flip flop 61 is connected with its Set input 61a connected to the output of the pulse shaper 59, with its Reset input connected to a point common to the normally closed switch 62 and the Reset input 55d of the flip flop 55 in the output of the delay 58, and with its Set output 61c connected to the control input 39d of the AND gate 39 and to the control input 41d of the AND gate 41.

The second flip flop 61, in conjunction with the AND gates 39 and 41, functions as a time control for the movement of the tape 15. That is, the circuit arrangement 61, 39 and 41 functions to determine the period of time during which the tape 15 may be moved without perforation. When the flip flop 61 is in its Set condition, which is as soon as any key of the keyboard 34 is depressed, it provides an output signal at its Set output 61c which is supplied to the control inputs 39d and 41d of AND gates 39 and 41, thus placing these AND gates in their conductive condition, if the other control inputs thereof as well as the inputs thereof have signals applied at the same time.

Ignoring for the moment the control input 39e of the AND gate 39, which will be described in operation hereinafter when the flip flop 55 is in its Set condition, the AND gate 39 will be in its non-conductive condition and the AND gate 41 will be in its conductive condition without considering the control inputs 39d and 41d. When the keyboard 34 is operated, the flip flop 61 is placed in its Set condition and produces an output signal at its Set output 61c which then places the AND gate 41 in its conductive condition and is ineffective in changing the non-conductive condition of the AND gate 39. The control pulse from the pulse generator 31 will then be transmitted through the AND gate 41 and the selected one of the AND gates 42 and 43 to the moving control 29 to move the tape in the selected forward or backward direction.

When the AND gate 41 passes the control pulse from the pulse generator 31 to the moving control 29, said control pulse is transmitted through the OR gate 57 and the time delay 58 to the Reset input 61b of the second flip flop 61 through the switch 62. The switch 62 is normally closed, so that the application of the control pulse to the Reset input 61b places or switches said flip flop to its Reset condition and said flip flop fails to provide a signal at its Set output 61c. Upon the next depression of a key of the keyboard, a signal is supplied to the Set input 61a of the flip flop 61 via the pulse shaper 59 and thereby places said flip flop back in its Set condition. Since, during the normal operation of the circuit, the flip flop 55 would then be in its Reset condition, the AND gate 39 will then be in its conductive condition and the AND gate 41 will be in its non-conductive condition, without considering the control inputs 39d and 41d. The flip flop 61 produces an output signal at its Set output 61c which then places the AND gate 39 in its conductive condition and is ineffective in changing the non-conductive condition of the AND gate 41. The control pulse from the pulse generator 31 will then be transmitted through the AND gate 39 to the perforator control 12 to energize the selected solenoids of the perforator 11.

Thus, the second flip flop 61, during the period when the switch 62 is closed, which is its normal condition, merely functions as an adjunct to the first flip flop 55 and does not affect the operation of the circuit arrangement 55, 39 and 41. Similarly, the first flip flop 55, during the period when the switch 62 is closed, which is its normal condition, functions to alternately switch power from the perforator to the moving control. When, however, the key-operated switch 62 is opened by depression of the key associated therewith, the operation at the time of the opening of said switch will continue normally until the moving control 29 is energized and will then continue indefinitely until the switch 62 is closed again. That is, when continuous movement of the tape without perforation of the tape is desired, the switch 62 is opened by depression of its associated key. When the key 62 is opened, there is no return path for the signal passed through the delay 58 so that the flip flop 61 cannot be switched back to its Reset condition and therefore remains in its Set condition and the flip flop 55 cannot be switched back to its Reset condition and also remains in its Set condition, so that the AND gate 41 is maintained in its conductive condition until said switch is closed. The tape 15 is moved continuously and the perforation is maintained deenergized during the entire time that the switch 62 remains open.

A third flip flop 63 is connected with its Set output 63a connected to the control input of the AND gate 43, with its Reset output 63b connected to the control input 42c of the AND gate 42, with its Set input 63c connected to one contact of a two contact directing switch 64 and with its Reset input 63d connected to the other contact of the direction switch 64. The armature arrangement of the switch 64 is preferably a double arm which ensures that at least one of the two contacts of the switch will be closed at all times. That is, the double armature prevents a neutral position in which neither contact of the switch is closed to a terminal 65 at which a control pulse, which may be from a separate source, but which is preferably from the pulse generator 31, is applied.

The switch 64 may be manually operated or may be operated via the keyboard 34 and in one position causes the moving control 29 to move the tape 15 in its forward direction 18 and in its other position causes said moving control to move said tape in its backward direction 19. If the operator desires that the tape be moved in the backward direction 19 during the course of operation of moving control 29 by the described circuit arrangement, he will move the armature of the direction switch 64 to contact the first contact 66a of said direction switch and thereby cause the application of the control pulse from the terminal 65 to the Set input 63c of the flip flop 63 thus placing said flip flop in its Set condition. When the third flip flop 63 is in its Set condition it provides an output signal at its Set output 63a which is supplied to the control input 43c of the AND gate 43 and places said AND gate in its conductive condition thereby transmitting the control pulse from the pulse generator 31 and AND gate 41 therethrough to the input 47 of the moving control 29. When the flip flop 63 is in its Set condition there is no output signal at its Reset output 63b so that the AND gate 42 is non-conductive and will not transmit the control pulse from the pulse generator 31 to the moving control 29.

If the operator desires to move the tape in its forward direction 18 during the course of operation of the moving control 29 by the described circuit arrangement, he will move the armature of the direction switch 64 to contact the second contact 66b of the switch and thereby cause the application of the control pulse from the terminal 65 to the Reset input 63d of the flip flop 63 thus placing said flip flop in its Reset condition. When the flip-flop 63 is in its Reset condition it provides an output signal at its Reset output 63b which is supplied to the control input 42c of the AND gate 42 and places said AND gate in its conductive condition thereby transmitting the control pulse from the pulse generator 31 and AND gate 41 therethrough to the input 46 of the moving control 29. When the flip flop 63 is in its Reset condition there is no output signal at its Set output 63a so that the AND gate 43 is non-conductive and will not transmit the control pulse from the pulse generator 31 to the moving control 29.

A fourth flip flop 67 is connected with its Reset output 67a connected to the control input 39e of the AND gate 39, with its Reset input 67b connected to one contact of a two contact directing switch 68 and with its Set input connected to the other contact of the directing switch 68. The directing switch 68 is similar to the directing switch 64 in structure and operation.

The switch 68, when operated in one position permits the normal operation of the circuit as described and when operated in its other position causes a termination of the perforation operation on the tape 15. If the operator desires that the perforation operation be continued for a normal predetermined period of time, he will move the armature of the directing switch 68 to contact the first contact 69a of the switch and thereby cause the application of the control pulse from the terminal 65 to the Reset input 67b of the flip flop 67 thus placing the flip flop in its Reset condition. Of course, the control pulse need not be that from the terminal 65 or that derived from the pulse generator 31, but may be from any suitable pulse source. When the fourth flip flop 67 is in its Reset condition it provides an output signal at its Reset output 67a which is supplied to the control input 39e of the AND gate 39 and places said AND gate in its conductive condition thereby permitting said AND gate to transmit the control pulse from the pulse generator 31 to the perforator control 12 when a signal is present in the control inputs 39c and 39d thereof.

When the operator desires to terminate the perforation operation on the tape 15, he positions the armature of the switch 68 to contact the second contact 69b thereof thereby supplying the control pulse to the Set input 67c of the flip flop 67. This places the flip flop 67 in its Set condition so that no output signal is provided at the Reset output 67a. The failure of application of a signal at the Reset output 67a of the flip flop 67 places the AND gate 39 in its non-conductive condition thereby blocking the control pulse from the pulse generator 31 and preventing it from passing to the perforator control 12 thus cutting off the perforation operation.

It is thus clear that during normal circuit operation the switch 68 is closed on its first contact 69a and the switch 64 is closed on its second contact 66b; the switch 62 being normally closed. The switch 62 is opened only when it is desired to continue the tape moving operation indefinitely, for as long as said switch is open, and the switch 64 is closed on its first contact 66a only when it is desired to move the tape in its backward direction 19. The switch 68 is closed on its second contact 69b only when it is desired to terminate the perforation operation. The perforation operation is prevented for as long as the switch 68 is closed on its contact 69b, just as it is prevented for as long as the switch 62 is open.

It is thus seen that during the normal operation of the circuit arrangement of FIG. 1 the control inputs 39d and 39e of the AND gate 39 carry a signal, the control input 41d of AND gate 41 carries a signal and the control input 42c of AND gate 42 carries a signal. The first flip flop 55 therefore controls the alternate perforation and movement operation aforedescribed in accordance with whether it is in its Set or Reset condition, since the necessary ancillary activating signals are present at the key AND gates.

Without further analysis, the foregoing will so fully reveal the gist of the present invention that others can by applying current knowledge readily adapt it for various applications without omitting features that, from the stand-point of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination,
  alternating current power supply means for providing alternating current power;
  pulse generating means connected to said alternating current power supply means for deriving control pulses from said alternating current power at determined time instants of the cyclic period of said alternating current power;
  perforator control means interconnected between said pulse generating means and the solenoids of said perforator;
  binary code keyboard means connected to said perforator control means for providing code combination signals to said perforator control means under control of a keyboard, said binary code keyboard means being adapted to prepare selected components of said perforator control means in accordance with said code combination signals;

moving control means interconnected between said pulse generating means and the forward and backward drive control means of said moving means; and pulse gating means interconnected between said pulse generating means and each of said perforator control means and said moving control means for controlling the transmission of control pulses from said pulse generating means to a selected one of said perforator control means and said moving control means in a manner whereby the operation of each of the said perforator control means and the said moving control means is dependent upon the transmission of said control pulses thereto at determined time instants and the condition of conduction of said pulse gating means.

2. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at determined time instants of the cyclic period of said alternating current power;

perforator control means interconnected between said pulse generating means and the solenoids of said perforator, said perforator control means comprising switching means adapted to switch power to said solenoids partly under the control of said control pulses;

binary code keyboard means connected to said perforator control means for providing code combination signals to said perforator control means under control of a keyboard, said binary code keyboard means being adapted to prepare selected switching means of said perforator control means in accordance with said code combination signals, said code combination signals, and said control pulses jointly controlling said selected switching means;

moving control means interconnected between said pulse generating means and the forward and backward drive control means of said moving means, said moving control means comprising further switching means adapted to switch power to said solenoids under the control of said control pulses; and pulse gating means interconnected between said pulse generating means and each of said perforator control means and said moving control means for controlling the transmission of control pulses from said pulse generating means to selected switching means of said perforator control means and said moving control means in a manner whereby the operation of each of the switching means of said perforator control means and of said moving control means is dependent upon the transmission of said control pulses thereto at determined time instants and the condition of conduction of said pulse gating means.

3. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising switching means adapted to switch power to said solenoids partly under the control of said control pulses;

binary code keyboard means connected to said perforator control means for providing code combination signals to said perforator control means under control of a keyboard, said binary code keyboard means being adapted to prepare selected switching means of said perforator control means in accordance with said code combination signals, said code combination signals and said control pulses jointly controlling said selected switching means;

moving control means interconnected between said pulse generating means and the forward and backward drive control means of said moving means, said moving control means comprising further switching means adapted to switch power to said solenoids under the control of said control pulses;

power supply means for supplying alternate remaining positive portions of said alternating current to said solenoids through the switching means of said perforator control means and for supplying alternate remaining positive portions of said alternating current to said drive control means through the further switching means of said moving control means; and pulse gating means interconnected between said pulse generating means and each of said perforator control means and said moving control means for controlling the transmission of control pulses from said pulse generating means to selected switching means of said perforator control means and said moving control means in a manner whereby the operation of each of the switching means of said perforator control means and of said moving control means is dependent upon the transmission of said control pulses thereto at the leading edge of each positive portion of said alternating current and the condition of conduction of said pulse gating means.

4. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulses;

power supply means for supplying alternate remaining positive portions of said alternating current to said solenoids through the thyratrons of said perforator control means and for supplying alternate remaining positive portions of said alternating current to said drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means.

5. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons connected to corresponding ones of a plurality of AND gates, said thyratrons and AND gates being adapted to switch power to said solenoids partly under the control of said control pulses;

binary code keyboard means connected to said perforator control means for providing code combination signals to said perforator control means under control of a keyboard, said binary code keyboard means being adapted to prepare selected AND gates of said perforator control means in accordance with said code combination signals, said code combination signals and said control pulses jointly controlling said selected AND gates;

moving control means interconnected between said pulse generating means and the forward and backward drive control means of said moving means, said moving control means comprising further thyratrons adapted to switch power to said solenoids under the control of said control pulses;

power supply means for supplying alternate remaining positive portions of said alternating current to said solenoids through the thyratrons of said perforator control means and for supplying alternate remaining positive portions of said alternating current to said drive control means through the further thyratrons of said moving control means and;

pulse gating means interconnected between said pulse generating means and each of said perforator control means and said moving control means for controlling the transmission of control pulses from said pulse generating means to selected AND gates of said perforator control means and to selected thyratrons of said moving control means in a manner whereby the operation of each of the thryratrons of said perforator control means and of said moving control means is dependent upon the transmission of said control pulses thereto at the leading edge of each positive portion of said alternating current and the condition of conduction of said pulse gating means.

6. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals, and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulses;

power supply means for supplying alternate remaining positive portions of said alternating current to said solenoids through the thyratrons of said perforator control means and for supplying alternate remaining positive portions of said alternating current to said

17 drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means, said pulse gating means comprising a first AND gate having an input connected to said pulse generating means, an output connected to the thyratrons of said perforator control means and a control input, a second AND gate having an input connected to said pulse generating means, an output coupled to the further thyratrons of said moving control means and a control input, and a flip flop having a Set output coupled to the control input of one of said first and second AND gates, a Reset output coupled to the control input of the other of said first and second AND gates, a Set input coupled to the output of the other of said first and second AND gates and a Reset input coupled to the one of said first and second AND gates in a manner whereby said first and second AND gates are alternately placed in conductive condition to transmit the control pulse derived from said pulse generating means alternately to each of said perforator control means and said moving control means.

7. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulses;

18 power supply means for supplying alternate remaining positive portions of said alternating current to said solenoids through the thyratrons of said perforator control means and for supplying alternate remaining positive portions of said alternating current to said drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means, said pulse gating means comprising a first AND gate having an input connected to said pulse generating means, an output connected to the thyratrons of said perforator control means and a pair of control inputs, and a second AND gate having an input connected to said pulse generating means, an ouput coupled to the further thyratrons of said moving control means and a pair of control inputs, a first flip flop having a Set output coupled to a control input of one of said first and second AND gates, a Reset output coupled to a control input of the other of said first and second AND gates, a Set input coupled to the output of the other of said first and second AND gates and a Reset input coupled to one of said first and second AND gates, a second flip flop having one of a Set and Reset output connected to the other control input of each of said first and second AND gates the same one of a Set and Reset input adapted to receive a control signal each time the keyboard of said binary code keyboard means is operated and the other of the Set and Reset input coupled to the output of said second AND gate, and normally closed switch means interposed between the output of said second AND gate and each of the inputs of said first flip flop coupled thereto and the input of said second flip flop coupled thereto in a manner whereby when said normally closed switch means is closed said first and second AND gates are alternately placed in conductive condition to transmit the control pulse derived from said pulse generating means alternately to each of said perforator control means and said moving control means and whereby when said normally closed switch means is open said first AND gate is placed in non-conductive condition to prevent the transmission of said control pulse to said perforator control means and said second AND gate is placed in conductive condition to permit the transmission of said control pulse to said moving control means.

8. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulse;

power supply means for supplying alternate remaining positive portions of said alternating current to said solenoids through the thyratrons of said perforator control means and for supplying alternate remaining positive portions of said alternating current to said drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means, said pulse gating means comprising a first AND gate having an input connected to said pulse generating means, an output connected to the thyratrons of said perforator control means and a pair of control inputs, a second AND gate having an input connected to said pulse generating means, an output and a pair of control inputs, a third AND gate having an input connected to the output of said second AND gate, an output connected to one of the further thyratrons of said moving control means and a control input, a fourth AND gate having an input connected to the output of said second AND gate, an output connected to the other of the further thyratrons of said moving control means and a control input, a first flip flop having a Set output coupled to a control input of one of said first and second AND gates, a Reset output coupled to a control input of the other of said first and second AND gates, a Set input coupled to the output of the other of said first and second AND gates and a Reset input coupled to the output of the one of said first and second AND gates through said third and fourth AND gates, a second flip flop having one of a Set and Reset output connected to the other control input of each of said first and second AND gates, the same one of a Set and Reset input adapted to receive a control signal each time the keyboard of said binary code keyboard means is operated and the other of the Set and Reset input coupled to the output of said second AND gate, normally closed switch means interposed between the outputs of said third and fourth AND gates and each of the inputs of said first flip flop coupled thereto and the input of said second flip flop coupled thereto in a manner whereby when said normally closed switch means is closed said first and second AND gates are alternately placed in conductive condition to transmit the control pulse derived from said pulse generating means alternately to each of said perforator control means and said moving control means and whereby when said normally closed switch means is open said first AND gate is placed in non-conductive condition to prevent the transmission of said control pulse to said perforator control means and said second AND gate is placed in conductive condition to permit the transmission of said control pulse to said moving control means, and a third flip flop having a Set output connected to the control input of one of said third and fourth AND gates, a Reset output connected to the control input of the other of said third and fourth AND gates and Set and Reset inputs adapted to selectively receive a control signal in a manner whereby when one of said Set and Reset inputs receives a control signal one of said third and fourth AND gates is placed in conductive condition and when the other of said Set and Reset inputs receives a control signal the other of said third and fourth AND gates is placed in conductive condition thereby controlling the transmission of the control pulse from said pulse generating means to a selected one of the further thyratrons of said moving control means.

9. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulses;

power supply means for supplying alternate remaining positive portions of said alternating current to said solenoids through the thyratrons of said perforator control means and for supplying alternate remaining positive portions of said alternating current to said drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means, said pulse gating means comprising a first AND gate having an input connected to said pulse generating means, an output connected to the thyratrons of said perforator control means and three control inputs, a second AND gate having an input connected to said pulse generating means an output and a pair of control inputs, a third AND gate having an input connected to the output of said second AND gate, an output connected to one of the further thyratrons of said moving control means and a control input, a fourth AND gate having an input connected to the output of said second AND gate, an output connected to the other of the further thyratrons of said moving control means and a control input, a first flip flop having a Set output coupled to a control input of one of said first and second AND gates, a Reset output coupled to a control input of the other of said first and second AND gates, a Set input coupled to the output of the other of said first and second AND gates and a Reset input coupled to the output of the one of said first and second AND gates through said third and fourth AND gates, a second flip flop having one of a Set and Reset output connected to another control input of each of said first and second AND gates, the same one of a Set and Reset input adapted to receive a control signal each time the keyboard of said binary code keyboard means is operated and the other of the Set and Reset input coupled to the output of said second AND gate, normally closed switch means interposed between the outputs of said third and fourth AND gates and each of the input of said first flip flop coupled thereto and the input of said second flip flop coupled thereto in a manner whereby when said normally closed switch means is closed said first and second AND gates are alternately placed in conductive condition to transmit the control pulse derived from said pulse generating means alternately to each of said perforator control means and said moving control means and whereby when said normally closed switch means is open said first AND gate is placed in non-conductive condition to prevent the transmission of said control pulse to said perforator control means and said second AND gate is placed in conductive condition to permit the transmission of said control pulse to said moving control means, a third flip flop having a Set output connected to the control input of one of said third and fourth AND gates, a Reset output connected to the control input of the other of said third and fourth AND gates and Set and Reset inputs adapted to selectively receive a control signal in a manner whereby when one of said Set and Reset inputs receives a control signal one of said third and fourth AND gates is placed in conductive condition and when the other of said Set and Reset inputs receives a control signal the other of said third and fourth AND gates is placed in conductive condition thereby controlling the transmission of the control pulse from said pulse generating means to a selected one of the further thyratrons of said moving control means, and a fourth flip flop having a Reset output connected to the third control input of said first AND gate and Set and Reset inputs adapted to selectively receive a control signal in a manner whereby when one of said Set and Reset inputs receives a control signal said first AND gate is maintained in conductive condition and when the other of said Set and Reset inputs receives a control signal said first AND gate is placed in non-conductive condition thereby preventing the transmission of the control pulse from said pulse generating means to the thyratrons of said perforator control means.

10. In a tape perforating arrangement including a perforator having a plurality of pins spaced from and adapted to perforate a tape and a plurality of solenoids each adapted to move a corresponding one of said pins into one of a perforating position wherein said one of said pins perforates said tape and a non-perforating position wherein said one of said pins remains spaced from said tape, and moving means adapted to move a tape in operative relation to said perforator in predetermined increments in one of a forward and backward direction relative to said perforator, said moving means having forward and backward drive control coil means, in combination, alternating current power supply means for providing alternating current power;

pulse generating means connected to said alternating current power supply means for deriving control pulses from said alternating current power at the leading edge of each positive portion of said alternating current;

perforator control means interconnected between said pulse generating means and the solenoids of said perforator, said perforator control means comprising a plurality of thyratrons adapted to switch power to said solenoids partly under the control of said control pulses;

binary code keyboard means connected to said perforator control means for providing code combination signals to said perforator control means under control of a keyboard, said binary code keyboard means being adapted to prepare selected thyratrons of said perforator control means in accordance with said code combination signals, said code combination signals and said control pulses jointly controlling said selected thyratrons;

moving control means interconnected between said pulse generating means and the forward and backward drive control means of said moving means, said moving control means comprising further thyratrons adapted to switch power to said solenoids under the control of said control pulses;

power supply means for supplying alternate remaining positive portions of said alternating current to said solenoids through the thyratrons of said perforator control means and for supplying alternate remaining positive portions of said alternating current to said drive control means through the further thyratrons of said moving control means; and pulse gating means interconnected between said pulse generating means and each of said perforator control means and said moving control means for controlling the transmission of control pulses from said pulse generating means to selected thyratrons of said perforator control means and said moving control means in a manner whereby the operation of each of the thyratrons of said perforator control means and of said moving control means is dependent upon the transmission of said control pulses thereto at the leading edge of each positive portion of said alternating current and the condition of conduction of said pulse gating means, said pulse gating means comprising a first AND gate having an input connected to said pulse generating means, an output connected to the thyratrons of said perforator control means and three control inputs, a second AND gate having an input connected to said pulse generating means, an output and a pair of control inputs, a third AND gate having an input connected to the output of said second AND gate, an output connected to one of the further thyratrons of said moving control means and a control input, a fourth AND gate having an input connected to the output of said second AND gate, an output connected to the other of the further thyratrons of said moving control means and a control input, a first flip flop having a Set output coupled to a control input of said second AND gate, a Reset output coupled to a control input of said first AND gate, a Set input coupled to the output of said first AND gate through time delay means and a Reset input coupled to the outputs of said third and fourth AND gates through time delay means, a second flip flop having a Set output connected to another control input of each of said first and second AND gates, a Set input adapted to receive a control signal each time the keyboard of said binary code keyboard means is operated and a Reset input coupled to the outputs of said third and fourth AND gates through said last-mentioned time delay means, normally closed switch means interposed between the outputs of said third and fourth AND gates and each of the Reset input of said first flip flop coupled thereto and the Reset input of said second flip flop coupled thereto in a manner whereby when said normally closed switch means is closed said first and second AND gates are alternately placed in conductive condition to transmit the control pulse from said pulse generating means alternately to each of said perforator control means and said moving control means and whereby when said normally closed switch means is open said first AND gate is placed in non-conductive condition to prevent the transmisison of said control pulse to said perforator control means and said second AND gate is placed in conductive condition to permit the transmission of said control pulse to said moving control means, a third flip flop having a Set output connected to the control input of said fourth AND gate, a Reset output connected to the control input of said third AND gate and Set and Reset inputs adapted to selectively receive a control signal in a manner whereby when said Set input receives a control signal said fourth AND gate is placed in conductive condition and when said Reset input receives a control signal said third AND gate is placed in conductive condition thereby controlling the transmission of the control pulse from said pulse generating means to a selected one of the further thyratrons of said moving control means, and a fourth flip flop having a Reset output connected to the third control input of said first AND gate and Set and Reset inputs adapted to selectively receive a control signal in a manner whereby when said Reset input receives a control signal said first AND gate is maintained in conductive condition and when said Set input receives a control signal said first AND gate is placed in non-conductive condition thereby preventing the transmission of the control pulse from said pulse generating means to the thyratrons of said perforator control means.

References Cited in the file of this patent

UNITED STATES PATENTS

| | | |
|---|---|---|
| 2,708,267 | Weidenhammer | May 10, 1955 |
| 2,798,554 | Smith | July 9, 1957 |
| 2,964,238 | King et al. | Dec. 13, 1960 |

FOREIGN PATENTS

| | | |
|---|---|---|
| 801,786 | Great Britain | Sept. 24, 1958 |